United States Patent
Oomi

(10) Patent No.: US 9,523,621 B2
(45) Date of Patent: Dec. 20, 2016

(54) ELECTRONIC CONTROL SYSTEM

(71) Applicant: DENSO CORPORATION, Aichi-Pref. (JP)

(72) Inventor: Keita Oomi, Anjo (JP)

(73) Assignee: DENSO CORPORATION, Kariya (JP)

( * ) Notice: Subject to any disclaimer, the term of this patent is extended or adjusted under 35 U.S.C. 154(b) by 955 days.

(21) Appl. No.: 13/793,450

(22) Filed: Mar. 11, 2013

(65) Prior Publication Data

US 2013/0275070 A1    Oct. 17, 2013

(30) Foreign Application Priority Data

Apr. 12, 2012    (JP) .................................... 2012-91296

(51) Int. Cl.
*G01L 23/10* (2006.01)
*G01L 19/04* (2006.01)
(Continued)

(52) U.S. Cl.
CPC .............. *G01L 19/04* (2013.01); *G01L 9/085* (2013.01); *G01L 23/10* (2013.01); *F02D 35/00* (2013.01); *F02D 45/00* (2013.01)

(58) Field of Classification Search
CPC .......... F02D 35/00; F02D 45/00; G01L 19/04; G01L 23/10; G01L 9/085
(Continued)

(56) References Cited

U.S. PATENT DOCUMENTS 4,744,243 A * 5/1988 Tanaka ................... F02D 35/023
73/114.28
4,744,244 A * 5/1988 Tanaka ................... F02D 35/023
73/1.62
(Continued)

FOREIGN PATENT DOCUMENTS

JP    S62-88932 U    6/1987
JP    S63-98535 A    4/1988
(Continued)

OTHER PUBLICATIONS

Office Action mailed Mar. 18, 2014 issued in corresponding JP application No. 2012-091296 (with English translation).

*Primary Examiner* — Toan Le
*Assistant Examiner* — Eyob Hagos
(74) *Attorney, Agent, or Firm* — Posz Law Group, PLC

(57) ABSTRACT

An electronic control system includes a microcomputer and a signal processing circuit, and receives output signals of an in-cylinder pressure sensor and a crank angle sensor. The output signal of the pressure sensor indicates an output voltage of a piezoelectric transducer and a reference voltage. The signal processing circuit includes a hold circuit and a differential amplifier circuit. The differential amplifier circuit amplifies a difference between the output signal of the pressure sensor and the output signal of the hold circuit and outputs the result to the microcomputer. The hold circuit switches over the output signals in response to a switchover instruction of the microcomputer. When the switchover instruction is a set instruction, the hold circuit holds as its output signal the output signal of the pressure sensor outputted at the time of receiving the set instruction. The microcomputer outputs the set instruction to the hold circuit in response to the output signal of the crank angle sensor.

12 Claims, 4 Drawing Sheets

(51) Int. Cl.
 G01L 9/08 (2006.01)
 *F02D 35/00* (2006.01)
 *F02D 45/00* (2006.01)

(58) Field of Classification Search
 USPC .......................................................... 702/98
 See application file for complete search history.

(56) References Cited

U.S. PATENT DOCUMENTS 5,746,178 A * 5/1998 Susaki ................. G01D 18/008
 123/399
2005/0156580 A1 7/2005 Hashimoto

FOREIGN PATENT DOCUMENTS

| | | |
|---|---|---|
| JP | A-7-280686 | 10/1995 |
| JP | H11-271364 A | 10/1999 |
| JP | A-2004-301823 | 10/2004 |
| JP | 2008298803 A * | 12/2008 |
| JP | A-2008-298803 | 12/2008 |
| JP | A-B2-4321029 | 8/2009 |

* cited by examiner

ELECTRONIC CONTROL SYSTEM

CROSS REFERENCE TO RELATED APPLICATION

This application is based on and incorporates herein by reference Japanese patent application No. 2012-91296 filed on Apr. 12, 2012.

TECHNICAL FIELD

The present disclosure relates to an electronic control system, which has a function of detecting an in-cylinder pressure by A/D-conversion of an output signal of an in-cylinder pressure sensor mounted on an internal combustion engine.

BACKGROUND

As disclosed in JP-A-2008-298803 (patent document 1), an in-cylinder pressure sensor is mounted on an internal combustion engine to output a signal corresponding to a pressure inside a combustion chamber of a cylinder (in-cylinder pressure) so that a combustion stage in the combustion chamber is detected based on a detection result of the pressure sensor. An in-cylinder pressure sensor body is fitted in an insertion hole formed in a cylinder head so that the pressure in the combustion chamber is applied to a piezoelectric transducer through a diaphragm of the pressure sensor. The pressure sensor thus outputs, as the output signal, a voltage corresponding to the applied pressure. As a sensor characteristic, an offset voltage is outputted when atmospheric pressure of a predetermined pressure level is applied.

Further, as disclosed in JP-A-7-280686 (patent document 2), an engine electronic control unit (ECU) detects an in-cylinder pressure by acquisition and A/D-conversion of an output signal of an in-cylinder pressure sensor. A combustion state such as ignition timing or combustion temperature is determined so that knocking or misfire is detected based on the detected in-cylinder pressure.

Patent document 2 further discloses a configuration for inputting the output signal of the pressure sensor to a microcomputer through an A/D conversion circuit after amplification by an amplification circuit in case of detecting the pressure by the pressure sensor.

It is not possible to eliminate a drift of the offset voltage of the pressure sensor caused by factors such as temperature under a surrounding environment such as in an internal combustion engine, in which temperature changes rapidly. It is therefore essential to correct the drift to accurately determine the pressure. In patent document 2, the drift of the output voltage is corrected by resetting the output voltage of the pressure sensor to a reference value at a timing, which corresponds to a predetermined crank angle based on a detection signal of a crank angle sensor provided for the internal combustion engine.

According to the above-described correction technology, it is necessary for a microcomputer to transmit an instruction to the pressure sensor side to reset the output signal of the pressure sensor to the reference value. For this reason, the microcomputer and the pressure sensor need be connected by a signal wire, which is separate from a signal wire of the pressure sensor for transmitting the output signal. This correction technology thus increases costs.

SUMMARY

It is therefore an object to provide an electronic control system, which realizes correction of a drift of an output voltage of an in-cylinder pressure sensor.

According to one aspect, an electronic control system is provided for an engine, which has a pressure sensor for outputting a pressure signal and a crank angle sensor for outputting an angle signal. The pressure signal is a difference between an output signal of a piezoelectric transducer and a reference voltage. The electronic control system comprises a signal processing circuit connected to the pressure sensor for processing the pressure signal of the pressure sensor and a microcomputer connected to the signal processing circuit for controlling the engine based on the pressure signal processed by the signal processing circuit and the angle signal of the crank angle sensor. The signal processing circuit includes a hold circuit and a differential amplification circuit. The differential amplification circuit is configured to amplify a difference between the pressure signal of the pressure sensor and an output signal of the hold circuit and outputs an amplified difference to the microcomputer. The hold circuit is configured to switch over the output signal thereof based on a switchover instruction of the microcomputer. The hold circuit continues to output a hold signal under a state that the switchover instruction is a set instruction. The hold signal corresponds to the pressure signal received from the pressure sensor immediately before the set instruction is received. The microcomputer is configured to output the set instruction to the hold circuit based on the angle signal of the crank angle sensor.

BRIEF DESCRIPTION OF THE DRAWINGS

The above and other objects, features and advantages will become more apparent from the following detailed description made with reference to the accompanying drawings. In the drawings.

DETAILED DESCRIPTION OF THE EMBODIMENT

Figure 1:
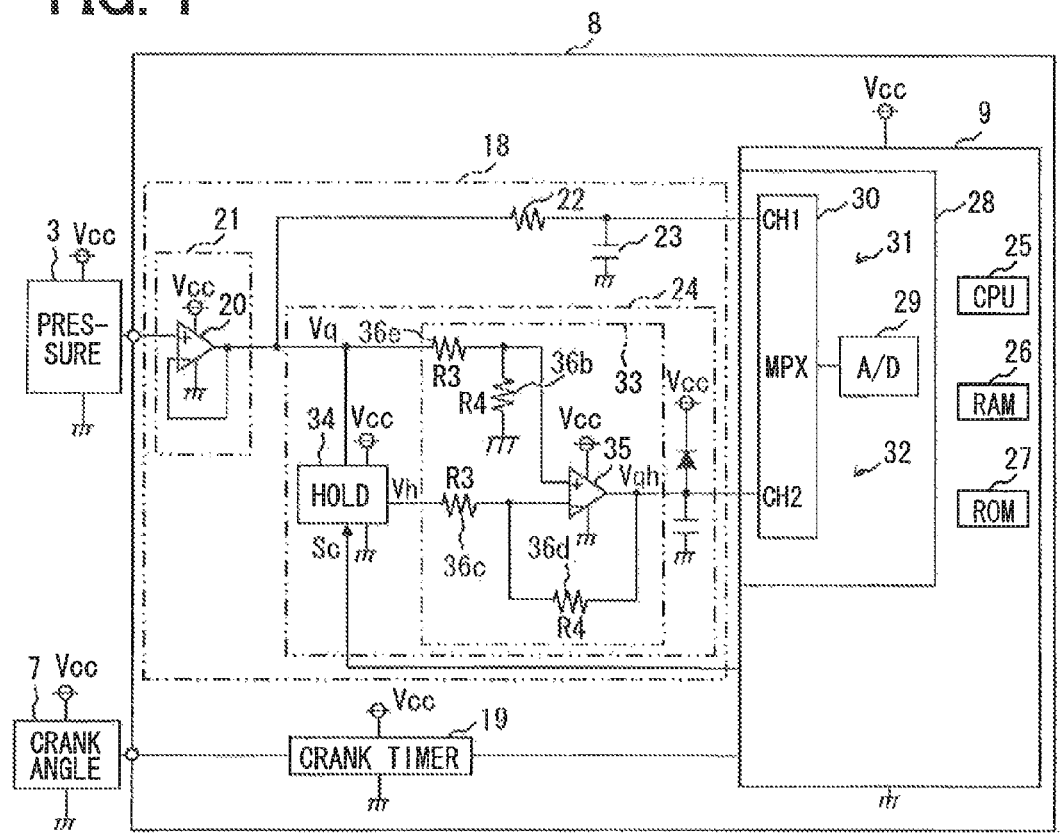
FIG. 1 is a circuit diagram of an electronic control system according to one embodiment.
Figure 2:
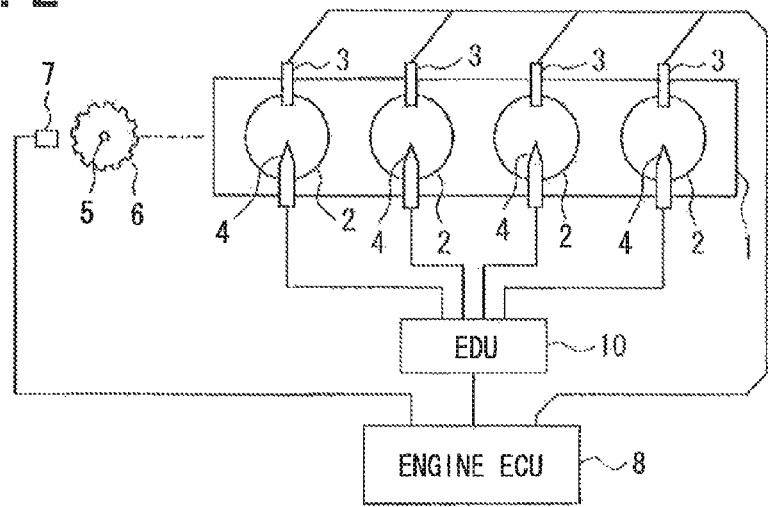
FIG. 2 is a schematic view showing an engine system, which is controlled by the electronic control system.

An electronic control system according to one embodiment is shown in FIG. 1 and implemented in an engine system shown in FIG. 2. An internal combustion engine 1 is a four-stroke engine having four cylinders 2 (cylinders #1 to #4). One combustion cycle of a four-stroke engine includes four strokes of suction, compression, combustion and exhaust and has one cycle period of 720° crank angles (720° CA). Each stroke is performed with a delay period of 180° CA between one cylinder and the successive cylinder.

Each cylinder 2 is formed of a cylinder block and a cylinder head and accommodates a piston therein. A combustion chamber is formed above the piston in the combustion chamber. An in-cylinder pressure sensor 3 is fitted in an insertion hole formed in each cylinder head and configured such that a pressure inside the combustion chamber is transmitted to a piezoelectric transducer 17 through a diaphragm part of the pressure sensor 3.

A fuel injector 4 is mounted on each cylinder 2 to inject fuel into its combustion chamber. By the combustion of injected fuel in the combustion chamber, the piston is reciprocated to rotate a crankshaft 5, which is an output shaft of the engine 1, with a pulser 6. The pulser 6 is formed a number of teeth on its outer periphery at every predetermined angular interval. A crank angle sensor 7 is positioned to face the pulser 6 and outputs signals in correspondence to rotation of the crankshaft 5. An output terminal of the crank angle sensor 7 is connected to a waveform shaper circuit, which generates a pulse signal by waveform-shaping each output signal of the crank angle sensor 7. This pulse signal is outputted to an engine ECU 8 as an output signal (angle signal) of the crank angle sensor 7.

The engine ECU 8 includes a microcomputer 9 and detects engine operation states based on the output signal of the crank angle sensor 7, the output signal of the pressure sensor 3 and output signals of other sensors by performing control programs stored in a RAM 26 and a ROM 27 of the microcomputer 9. The engine ECU 8 performs, based on the detected engine operation states, fuel supply control and fuel injection control by calculating fuel injection start timing and fuel injection duration. The engine ECU 8 outputs an injection signal to an electric driver unit (EDU) 10 thereby to drive the injector 4.

As shown in FIG. 1 in detail, the electronic control system is configured by the pressure sensor 3, the crank angle sensor 7 and the engine ECU 8, to which the output signals of these sensors are inputted.

Figure 3:
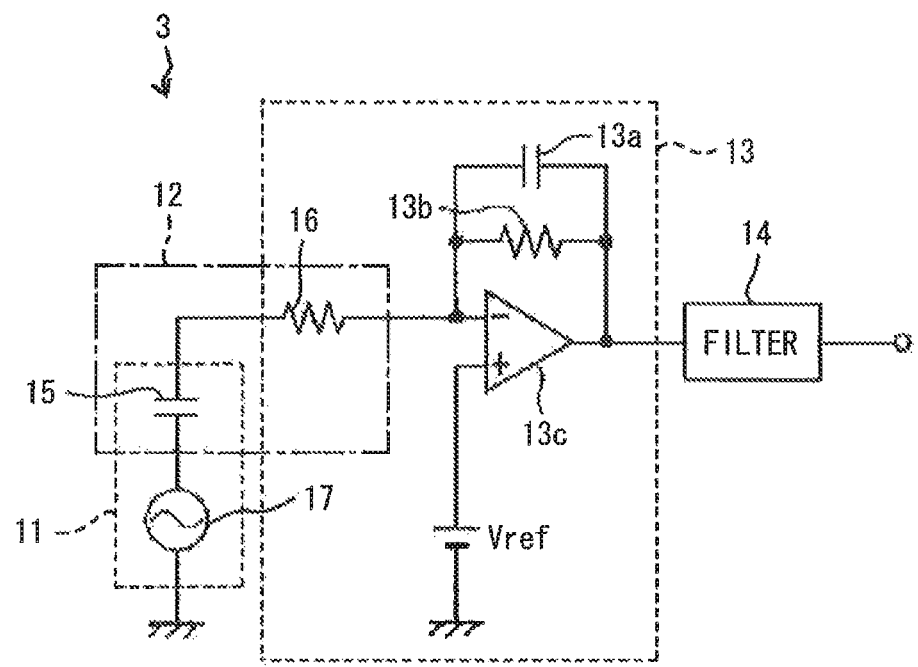
FIG. 3 is a circuit diagram of an in-cylinder pressure sensor used in the embodiment.

The pressure sensor 3 is configured as shown in FIG. 3. The pressure sensor 3 includes an in-cylinder pressure detection element 11, a differentiation circuit 12, an integration circuit 13 and a filter circuit 14. An output signal of the pressure detection element 11 is inputted to the differentiation circuit 12 and an output signal of the differentiation circuit 12 is inputted to the integration circuit 13. An output signal of the integration circuit 13 is passed through the filter circuit 14, which removes unnecessary frequency components such as noises, and inputted to the engine ECU 8 as a pressure signal of the pressure sensor 3.

An operation of the pressure sensor 3 will be described next. The pressure detection element 11 includes a piezoelectric transducer 17, which generates an electric charge corresponding to stress applied to the pressure detection element 11, and the output signal corresponding to the generated charge is inputted to the differentiation circuit 12. The differentiation circuit 12 converts the output signal into a current by differentiation of the output signal of the piezoelectric transducer 17. The integration circuit 13 integrates the output signal (current) of the differentiation circuit 12 and generates a voltage signal, which corresponds to the detected pressure. Thus the voltage signal has a waveform changing with pressure changes.

The differentiation circuit 12 and the integration circuit 13 of the pressure sensor 3 will be described in more detail below. The pressure detection element 11 includes an equivalent capacitor 15. The differentiation circuit 16 is formed of the capacitor 15 and a resistor 16, which is connected externally to the capacitor 15. The integration circuit 13 is formed of a capacitor 13a, a resistor 13b, an operational amplifier 13c and the resistor 16 of the differentiation circuit 12. The resistors 13b and 16, which form the integration circuit 13, and the operational amplifier 13c form an amplification circuit. The capacitor 13a is connected in parallel to the resistor 13b for an integration operation. A predetermined reference voltage Vref is applied to a non-inverting input terminal of the operational amplifier 13c forming the amplification circuit, so that the potential at the non-inverting input terminal is elevated to a positive potential. Thus the potential at the inverting input terminal of the operational amplifier 13c is elevated to the same potential as that of the non-inverting input terminal. An output signal of the operational amplifier 13c varies up and down from that potential (Vref) as a center of amplitude. The reference voltage Vref is, as one example, may be generated by dividing a fixed voltage (for example, 5V). The output signal of the operational amplifier 13c is passed through the filter circuit 14 and inputted to the engine ECU 8 as the output signal of the pressure sensor 3.

Referring back to FIG. 1, the engine ECU 8 includes a pressure sensor signal input circuit 18, a crank timer 19 and the microcomputer 9. The signal input circuit 18 is provided for each in-cylinder pressure sensor 3, although only one is shown in FIG. 1. The pressure signal input circuit 18 includes a buffer circuit 21, which is formed in a voltage follower circuit by an operational amplifier 20, a low-pass filter, which is formed of a resistor 22 and a capacitor 23, and a drift correction circuit 24. The microcomputer 9 includes a CPU 25, a RAM 26, a ROM 27 and an A/D conversion circuit 28.

The A/D conversion circuit 28 includes a plural channel structure, which is formed of an A/D converter 29 and a multiplexer 30. The pressure signal input circuit 18 of each cylinder 2 uses two channels, and hence a total of eight channels are used in a case of four cylinders. In a case of the cylinder #1, the output signal of the pressure sensor 3 is passed through the pressure signal input circuit 18 and then A/D-converted by using a first channel (CH1) and a second channel (CH2). The A/D conversion circuits 28 corresponding to CH1 and CH2 are referred to as a first A/D conversion circuit 31 and a second A/D conversion circuit 32, respectively. In FIG. 1, other channels are not shown. An input level of the A/D conversion circuit 31 is limited to a range from 0V (low limit voltage) to 5V (high limit voltage) for each channel.

The output signal of the crank angle sensor 7 inputted to the engine ECU 8 is inputted to the crank timer 19. The crank timer 19 detects a crankshaft rotation position (crankshaft angle) based on the inputted crank angle signal and outputs a detection result to the microcomputer 9.

The output signal (pressure signal 9 of the pressure sensor 3 inputted to the engine ECU 8 is inputted to the buffer circuit 21 as an input signal for the pressure signal input circuit 18, passed through the buffer circuit 21 and then bifurcated into two. One bifurcated signal is passed through the low-pass filter formed of the resistor 22 and the capacitor 23, inputted to the microcomputer 9 as the output signal of the pressure signal input circuit 18 and then A/D-converted by the second A/D conversion circuit 32 in the microcomputer 9. The other bifurcated signal is passed through the correction circuit 24, inputted to the microcomputer 9 as the output signal of the pressure signal input circuit 18 and then A/D-converted by the second A/D conversion circuit 32 in the microcomputer 9. The filter circuit formed of the resistor 22 and the capacitor 23 is provided bypassing the drift correction circuit 24.

The correction circuit 24 includes a differential amplifier circuit 33 and a hold circuit 34. The input signal inputted to the correction circuit 24, that is, the output signal of the pressure sensor 3 having passed through the buffer circuit 21 is inputted to the differential amplification circuit 33 as a positive phase input. The output signal of the differential amplification circuit 33 is outputted to the microcomputer 9 as the output signal of the correction circuit 24 and as the output signal of the pressure signal input circuit 18.

The differential amplification circuit 33 is formed of an operational amplifier 35 and resistors 36a, 36b, 36c, 36d. Assuming that resistances of the resistors 35a and 36c are R3, resistances of the resistors 36b and 36d are R4, an input voltage at the normal phase side of the amplification circuit 33 is Vq and an input voltage at the reverse phase side of the same is Vh, the output voltage Vqh is expressed by the following equation 1.

$$Vqh=R4(Vq-Vh)/R3 \qquad [\text{Eq. 1}]$$

The output signal of the pressure sensor 3, which is inputted to the correction circuit 24, that is, passed through the buffer circuit 21, is inputted. An output signal of the hold circuit 34 is inputted to the amplification circuit 33 as a reverse phase input. The hold circuit 34 is set and reset by a switch control signal Sc outputted from the microcomputer 9.

The hold circuit 34 holds and continues to output its input signal, which is inputted at a set timing, during a period from setting to resetting of the hold circuit 34. This input signal is a hold signal, which corresponds to the output signal of the pressure sensor 3 having passed through the buffer circuit 21. The hold circuit 34 continues to output its input signal as it is during a period from resetting to setting of the hold circuit 34. This input signal corresponds to the output signal of the pressure sensor 3, which passed through the buffer circuit 21.

Figure 4:
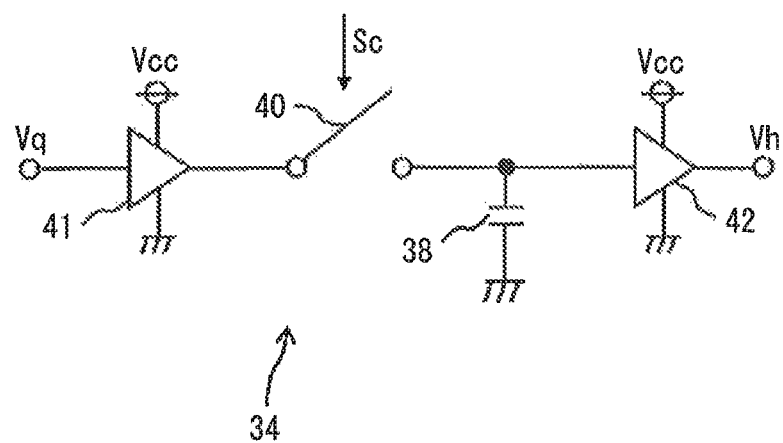
FIG. 4 is a circuit diagram of a hold circuit used in the embodiment.

The hold circuit 34 may be configured as shown in FIG. 4 as one practical example. The hold circuit 34 shown in FIG. 4 is formed of buffer circuits 41, 42, a capacitor 38 and a switch 40. The hold circuit 34 sets the switch 40 to OFF when a set instruction is inputted. The hold circuit 34 continues to turn off the switch 40 until a reset instruction is inputted. When the reset instruction is inputted, the hold circuit 34 sets the switch 40 to ON. The hold circuit 34 continues to turn on the switch 40 until the set instruction is inputted. According to this configuration, the capacitor 38 is charged or discharged when the hold circuit 34 is in the reset state. The hold circuit 34 thus outputs the input voltage Vq of the hold circuit 34 as it is in the reset state. In this state, the output signal of the hold circuit 34 varies proportionally to the input signal to the hold circuit 34. At a moment when the hold circuit 34 is set, the switch 40 is turned off and the capacitor 38 holds the charge stored therein at the time of setting. As a result, the output voltage of the hold circuit 34 is maintained at the input voltage Vq of the hold circuit 34 even if the input voltage Vq varies thereafter.

The microcomputer 9 detects the crank angle based on the output signal of the crank timer 19, which changes proportionally in correspondence to rotation of the crankshaft. The microcomputer 9 sets the hold circuit 34 at the timing, which corresponds to a crank angle immediately before the compression stroke in each combustion cycle, for example, at BTDC 190° CA (refer to FIG. 5). This crank angle immediately before the compression stroke is referred to as a set position (crank angle) corresponding to a set timing. Although the crank angle immediately before the compression stroke is referred to as the set position, a different crank angle other than the crank angle immediately before the compression stroke may be referred to as a set position. The set position need not be fixed but may be variable from combustion cycle to combustion cycle.

According to the present embodiment, the output voltage of the pressure sensor 3, which is outputted at the timing corresponding to the set position in each combustion cycle, that is, at the timing immediately before the compression stroke, is referred to as a pressure detection start-time voltage. After the setting, the pressure detection start-time voltage is inputted to the differential amplification circuit 33 as the reverse phase input until resetting. The differential amplification circuit 33 subtracts the pressure detection start-time voltage from the output voltage of the pressure sensor 3 and outputs a resulting voltage after amplification. The resetting may be made after the setting but before the next setting. As one example, the resetting is made at a predetermined timing, for example, at ATDC 300° CA, which is in a period of the exhaust stroke or the suction stroke of the combustion cycle. The crank angle, which corresponds to the reset timing, is referred to as a reset position (crank angle). The reset position need not be fixed but may be varied from combustion cycle to combustion cycle.

Figure 5:
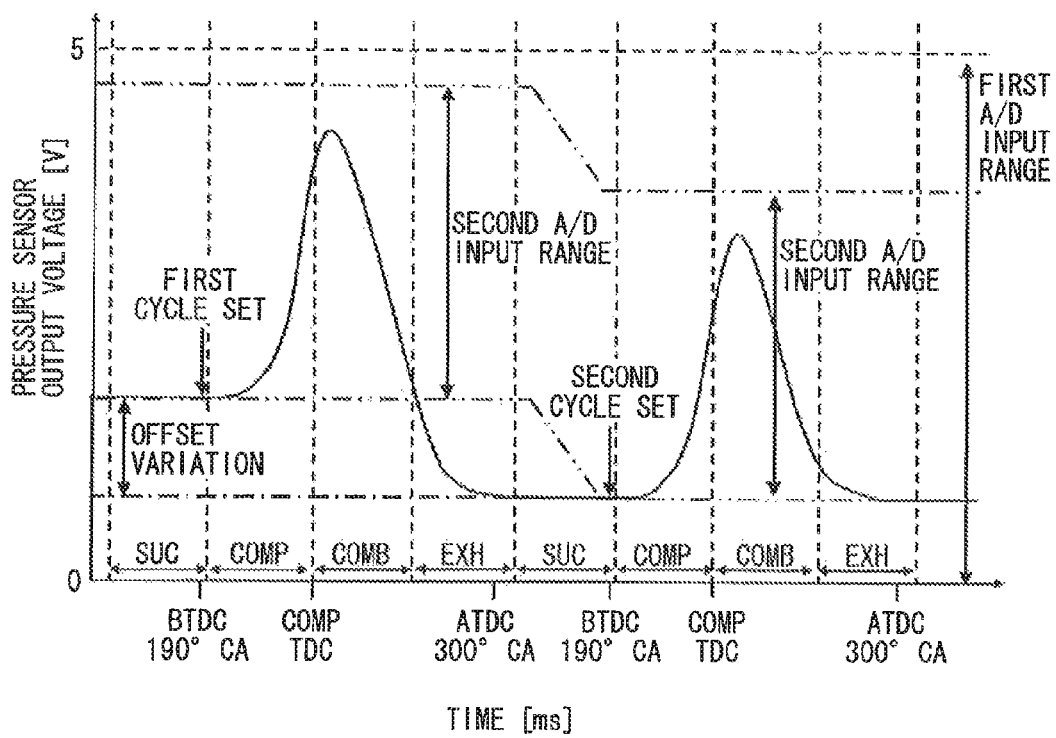
FIG. 5 is a time chart showing time changes in an output voltage of the pressure sensor in the embodiment.

The operation of setting and resetting of the hold circuit 34 at the above-described timings will be described with reference to FIG. 5, which shows time changes of the output voltage of the pressure sensor 3 over an angular interval of two combustion cycles (720° CA). Generally, the pressure in the combustion chamber sharply rises in correspondence to the compression stroke and attains its maximum at or near a compression TDC (compression top dead center) through combustion stroke. Thereafter it rapidly falls in a period from the combustion stroke to the exhaust stroke and reaches a minimum pressure in a period from the exhaust stroke to the suction stroke. The output voltage of the pressure sensor 3 changes similarly to the pressure. However, a drift arises in the output voltage due to changes in temperature and pressure in the combustion chamber. The drift of the output voltage of the pressure sensor 3 indicates a deviation of a zero point of the output voltage of the pressure sensor 3, that is, the deviation in the output voltage value outputted when atmospheric pressure is being applied to the pressure sensor 3. The drift arises in the output voltage of the pressure sensor 3 immediately after the output voltage of the pressure sensor 3 returns to the offset voltage, which is the output voltage outputted when the atmospheric pressure is being applied to the pressure sensor 3, after the output voltage of the pressure sensor 3 increases in the combustion stroke in the combustion cycle and then decreases to the offset voltage.

To update the pressure detection start-time voltage, which is inputted to the differential amplification circuit 33 as the reverse phase input, to be before the compression stroke in each combustion cycle, the hold circuit 34 is set at the timing, which is immediately before the compression stroke, and reset by the setting in the next combustion cycle. Thus the pressure detection start-time voltage, which is outputted before being affected by the drift in the combustion cycle, is continuously inputted to the differential amplification circuit 33 throughout the compression stroke and the combustion stroke. As a result, the pressure can be detected from the output signal of the differential amplification circuit 33 without being affected by the drift, which arises at the above-described timing. Even when a drift arises at a timing different from the above-described timing, the drift is corrected in every combustion cycle. Therefore, the drift continues to affect only up to the next set timing and its influence is mitigated.

Figure 6:
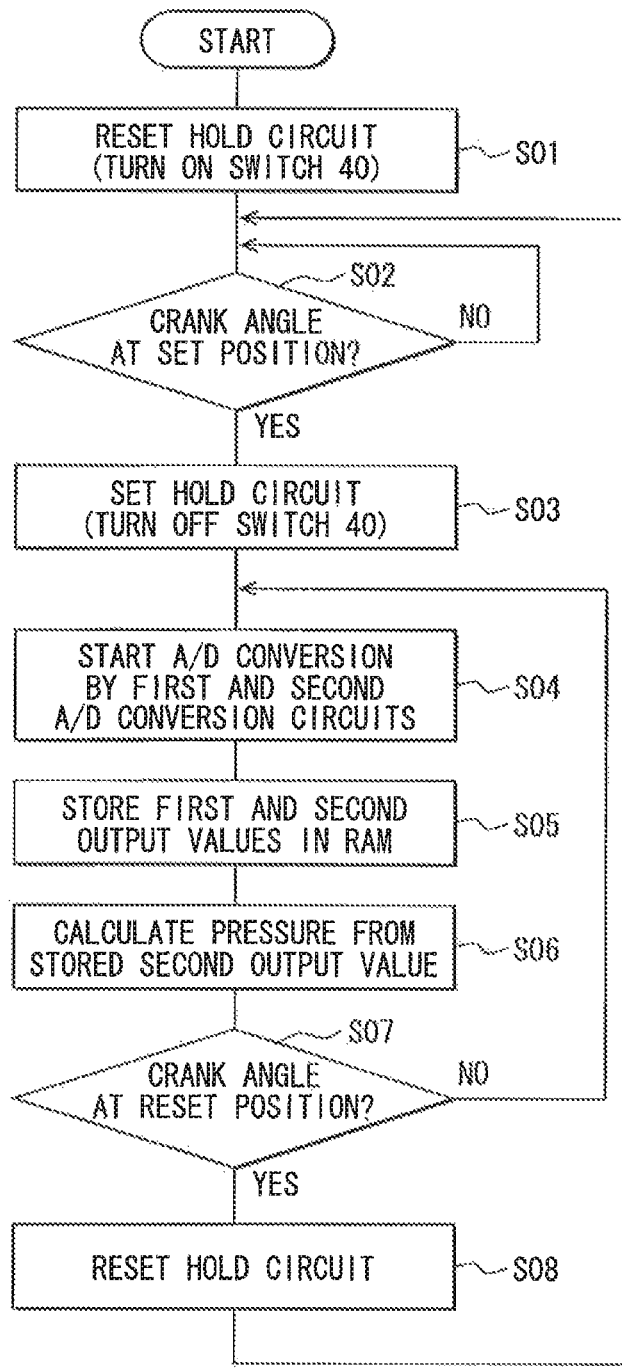
FIG. 6 is a flowchart showing in-cylinder pressure detection processing performed by a microcomputer in the embodiment.

FIG. 6 is a flowchart showing in-cylinder pressure detection processing performed repetitively by the microcomputer 9. The microcomputer 9 starts this pressure detection processing immediately before the engine 1 is started, for example, when an ignition is turned on to supply electric power. After starting the pressure detection processing, the microcomputer 9 resets the hold circuit 34 by turning on the switch 40 (step S01). The microcomputer 9 then waits until the crankshaft is rotated to a predetermined angular position, that is, until the crank angle is detected to correspond to the set position (S02).

When the microcomputer 9 detects that the crank angle is at the set position (YES), the microcomputer 9 sets the hold circuit 34 (S03) by turning off the switch 40. The hold circuit 34 may be set immediately after detection that the crank angle equals the set position. Alternatively the hold circuit 34 may be set after an elapse of a predetermined angular or time period from the detection of set position. The hold circuit 34 is in the reset state immediately before setting and hence outputs the output signal (pressure signal) of the pressure sensor 3 itself, which is variable and inputted to the hold circuit 34. At a time point when the hold circuit 34 is set, the pressure detection start-time voltage is inputted to the hold circuit 34 as an initial pressure detection voltage. The hold circuit 34 continues to output the same pressure detection start-time voltage during a period from the setting to the resetting.

The microcomputer 9 next starts A/D conversions by the first A/D conversion circuit 31 and the second A/D conversion circuit 32 (S04) and then stores output values of the respective A/D conversion circuits 31 and 32 in the RAM 26 (S05). The microcomputer 9 calculates an in-cylinder pressure based on the second A/D conversion circuit output value stored in the RAM 26 (S06). If it is not possible to calculate the pressure based on the second A/D conversion circuit output value due to, for example, abnormality of the drift correction circuit 24, the microcomputer 9 calculates the pressure based on the first A/D conversion circuit output value.

The microcomputer 9 then checks whether the crank angle is detected as being at the reset position (S07), and repeats S04, S05 and S06 until the crank angle is detected as being at the reset position. When the microcomputer 9 determines that the crank angle is at the reset position, the computer resets the hold circuit 34 (S08) and performs S02 again. The hold circuit 34 may be reset immediately after detection that the crank angle equals the reset position. Alternatively the hold circuit 34 may be reset after an elapse of a predetermined time or angular period from the detection of resetting. In a case that the hold circuit 34 is configured as shown in FIG. 4, the capacitor 38 need be charged or discharged after the hold circuit 34 is instructed to be reset until the hold circuit 34 is actually reset, that is, the hold circuit 34 outputs the input signal itself. To ensure such a required period, the microcomputer 9 may instruct the setting of the hold circuit 34 with a certain delay period after the instruction of resetting the hold circuit 34.

According to the present embodiment described above, the differential amplification circuit 33 is provided to be continuously inputted with the pressure detection start-time voltage as the reverse phase input from the setting to the resetting of the hold circuit 34. Further, the microcomputer 9 is configured to set the hold circuit 34 at every combustion cycle. Thus the pressure can be detected from the output signal of the differential amplifier circuit 33 without being influenced by drifts. The hold circuit 34 is set and reset by the switch control signal Sc outputted from the microcomputer 9. Since the hold circuit 34 and the microcomputer 9 are also arranged in the same engine ECU 8, it is not necessary to provide a signal wire, which transmits the switch control signal Sc, between the engine ECU 8 and the pressure sensor 3. That is, influence of drifts, which arises at the pressure sensor 3 side, can be suppressed at low costs.

When the hold circuit 34 is in the set state (switch 40 is in the off-state), the output signal of the differential amplification circuit 33 equals a voltage, which results from subtraction of the pressure detection start-time voltage from the output voltage of the pressure sensor 3 and amplification of the subtraction result. Thus, a gain for the output signal of the pressure sensor 3 can be set higher than in a case, in which the pressure detection start-time voltage is not subtracted from the output voltage of the pressure sensor 3. As a result, the power of resolution of the second A/D conversion circuit 32 can be enhanced. For this reason, the dynamic range of the second A/D conversion circuit 32 for the output signal of the pressure sensor 3 can be widened to detect the pressure with high accuracy.

When the hold circuit 34 is in the reset state, the hold circuit 34 outputs the output voltage of the pressure sensor 3 as inputted. Thus the output voltage of the differential amplification circuit 33 is zero. For this reason, if the output voltage of the differential amplification circuit 33 is not zero when the hold circuit 34 is in the reset state, it is possible to determine that the hold circuit 34 is failing.

The electronic control system is not limited to the above-described embodiment, but may be implemented in other embodiments.

What is claimed is:

1. An electronic control system for an engine having a pressure sensor for outputting a pressure signal and a crank angle sensor for outputting an angle signal, the pressure signal being a difference between an output signal of a piezoelectric transducer and a reference voltage, the electronic control system comprising:

a signal processing circuit that is connected to the pressure sensor for processing the pressure signal of the pressure sensor, and that includes a hold circuit and a differential amplification circuit; and a microcomputer connected to the signal processing circuit for controlling the engine based on the pressure signal processed by the signal processing circuit and the angle signal of the crank angle sensor, the microcomputer is configured to detect that a cylinder, on which the pressure sensor is mounted, is at a set timing based on the angle signal of the crank angle sensor, and to output a set instruction to the hold circuit when the cylinder is detected as being at the set timing, the set timing is set to be in a suction stroke of the cylinder, wherein the differential amplification circuit is configured to amplify a difference between the pressure signal of the pressure sensor and an output signal of the hold circuit and output an amplified difference signal to the microcomputer, the hold circuit is configured to switch over the output signal thereof based on a switchover instruction of the microcomputer, the hold circuit continues to output a hold signal under a state that the switchover instruction is the set instruction, the hold signal corresponding to the pressure signal received from the pressure sensor immediately before the set instruction is received, and the microcomputer is configured to output the set instruction to the hold circuit based on the angle signal of the crank angle sensor, wherein the pressure signal of the pressure sensor is a pressure detection start-time voltage, the microcomputer calculates a fuel injection start time based on the pressure detection start-time voltage, the cylinder cycles through a plurality of compression cycles, each of the plurality of compression cycles includes the suction stroke, a compression stroke, a combustion stroke, and an exhaustion stroke, and the hold circuit is configured to update the pressure detection start-time voltage during the suction stroke and before the cylinder enters the compression stroke of each compression cycle of the cylinder.

2. The electronic control system according to claim 1, wherein:

the set timing is set to be immediately before a start of a compression stroke of the cylinder.

3. The electronic control system according to claim 1, wherein:

the microcomputer is configured to detect that the cylinder is at a reset timing based on the angle signal of the crank angle sensor;

the microcomputer is configured to output a reset instruction to the hold circuit when the cylinder is detected as being at the reset timing;

the hold circuit is configured to output the pressure signal of the pressure sensor after the reset instruction is received until the set instruction is received again; and the reset timing is set to be in an exhaust stroke or in a suction stroke of the cylinder.

4. The electronic control system according to claim 3, wherein:

the microcomputer is configured to output the set instruction after a time delay from output of the reset instruction, the time delay being corresponding to a period required for the output voltage of the hold circuit to stabilize.

5. The electronic control system according to claim 1, further comprising:

a bypass circuit provided to transmit the pressure signal of the pressure sensor to the microcomputer bypassing the signal processing circuit.

6. The electronic control system according to claim 1, wherein:

the microcomputer is configured to apply the set instruction and the reset instruction to the hold circuit once in one combustion cycle of a suction stroke, a compression stroke, a combustion stroke and an exhaust stroke of the cylinder of the engine.

7. The electronic control system according to claim 1, further comprising a drift correction circuit that is configured to correct a drift in the pressure signal of the pressure sensor, that is located within the signal input circuit, and that includes the hold circuit and the differential amplification circuit.

8. An electronic control system for an engine having a pressure sensor for outputting a pressure signal and a crank angle sensor for outputting an angle signal, the pressure signal being a difference between an output signal of a piezoelectric transducer and a reference voltage, the electronic control system comprising:

a signal processing circuit that is connected to the pressure sensor for processing the pressure signal of the pressure sensor, and that includes a hold circuit and a differential amplification circuit; and a microcomputer that is connected to the signal processing circuit for controlling the engine based on the pressure signal processed by the signal processing circuit and the angle signal of the crank angle sensor, the microcomputer and that is configured to detect that a cylinder is at a predetermined timing based on the angle signal of the crank angle sensor, control the hold circuit to output a hold signal, which corresponds to the pressure signal received immediately before a set instruction is applied to the hold circuit, until the cylinder is detected as being at the predetermined timing, the predetermined timing is set to be in an exhaust stroke or in a suction stroke of the cylinder, and output the set instruction to the hold circuit based on the angle signal of the crank angle sensor, wherein the differential amplification circuit is configured to amplify a difference between the pressure signal of the pressure sensor and an output signal of the hold circuit and output an amplified difference signal to the microcomputer, and the hold circuit is configured to switch over the output signal thereof based on a switchover instruction of the microcomputer, the hold circuit continues to output the hold signal under a state that the switchover instruction is the set instruction, the hold signal corresponding to the pressure signal received from the pressure sensor immediately before the set instruction is received, wherein the pressure signal of the pressure sensor is a pressure detection start-time voltage, the microcomputer calculates a fuel injection start time based on the pressure detection start-time voltage, the cylinder cycles through a plurality of compression cycles, each of the plurality of compression cycles includes the suction stroke, a compression stroke, a combustion stroke, and an exhaustion stroke, and the hold circuit is configured to update the pressure detection start-time voltage during the suction stroke and before the cylinder enters the compression stroke of each compression cycle of the cylinder.

9. The electronic control system according to claim 8, further comprising a drift correction circuit that is configured to correct a drift in the pressure signal of the pressure sensor, that is located within the signal input circuit, and that includes the hold circuit and the differential amplification circuit.

10. The electronic control system according to claim 8, wherein the predetermined timing is set to be in an exhaust stroke of the cylinder.

11. The electronic control system according to claim 8, wherein the predetermined timing is set to be in a suction stroke of the cylinder.

12. The electronic control system according to claim 8, wherein the predetermined timing is a reset timing, and the set instruction is a reset instruction.

* * * * *